United States Patent [19]
Yawn et al.

[11] Patent Number: 5,031,389
[45] Date of Patent: Jul. 16, 1991

[54] DOUBLE MOWER

[76] Inventors: Valda E. Yawn; Patricia Yawn, both of Rte. 2, P.O. Box 170E, LaBelle, Fla. 33935

[21] Appl. No.: 525,620

[22] Filed: May 21, 1990

[51] Int. Cl.$^5$ .................. A01D 34/66; A01D 75/30
[52] U.S. Cl. .......................... 56/6; 56/13.6; 56/DIG. 10
[58] Field of Search .......... 56/6, 17.1, DIG. 10, 56/13.5, 13.6

[56] References Cited

U.S. PATENT DOCUMENTS

| | | | |
|---|---|---|---|
| 3,166,880 | 1/1965 | Robinson | 56/DIG. 10 X |
| 3,418,790 | 12/1968 | Whitefield et al. | 56/6 |
| 4,538,400 | 9/1985 | Hottes | 56/6 X |
| 4,707,971 | 11/1987 | Forpahl et al. | 56/6 |
| 4,912,915 | 4/1990 | Smit | 56/6 |

Primary Examiner—Ramon S. Britts
Assistant Examiner—David J. Bagnell
Attorney, Agent, or Firm—Alfred E. Wilson

[57] ABSTRACT

A construction having two separately operable mowers driven by a single tractor unit. The tractor drives our double gear box, which is operably connected to drive two laterally spaced separate gear boxes, each of which drives grass cutting blades. Each of the two mowers has four wheels at the rear to permit elevating or lowering the grass cutting blade to control the degree of cut. With this construction it is possible to cut the grass regardless of the elevation of the grass. One of the units can be mowing the grass on a horizontal portion of a bed, while the other unit is operating on the slope of one of the beds. It is also readily possible to mow the grass at the bottom of the v shaped area between two beds.

7 Claims, 4 Drawing Sheets

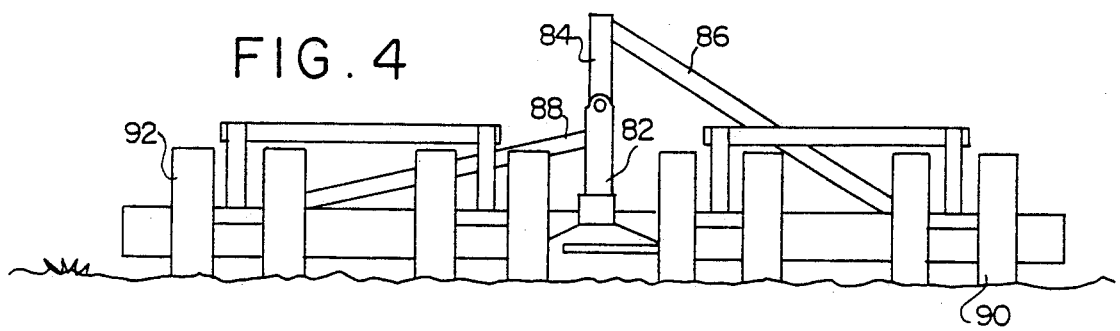
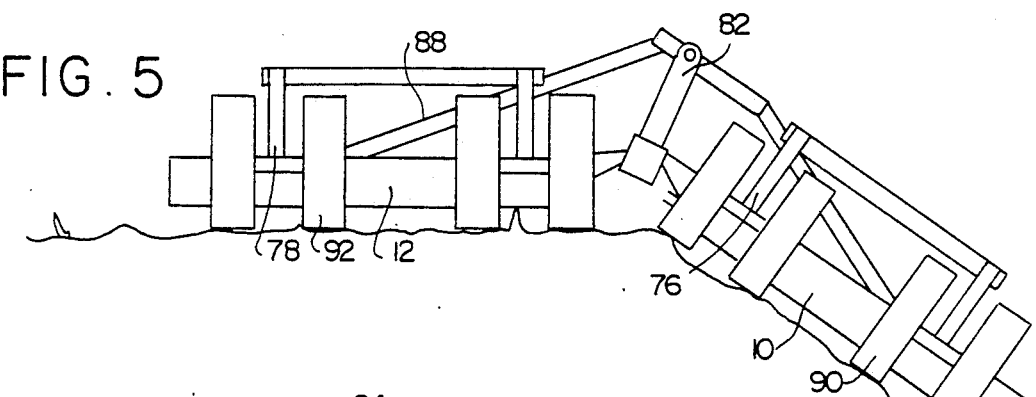
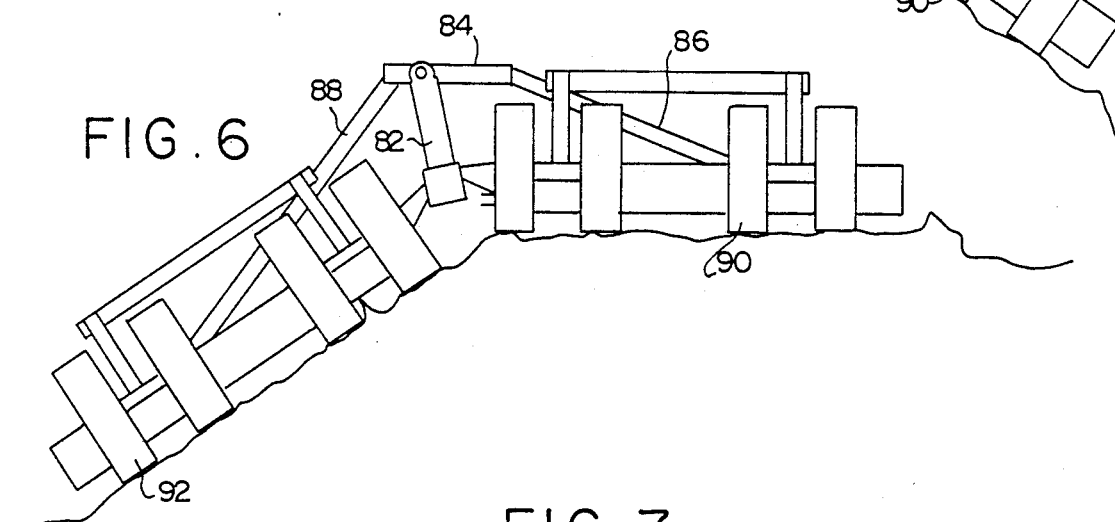
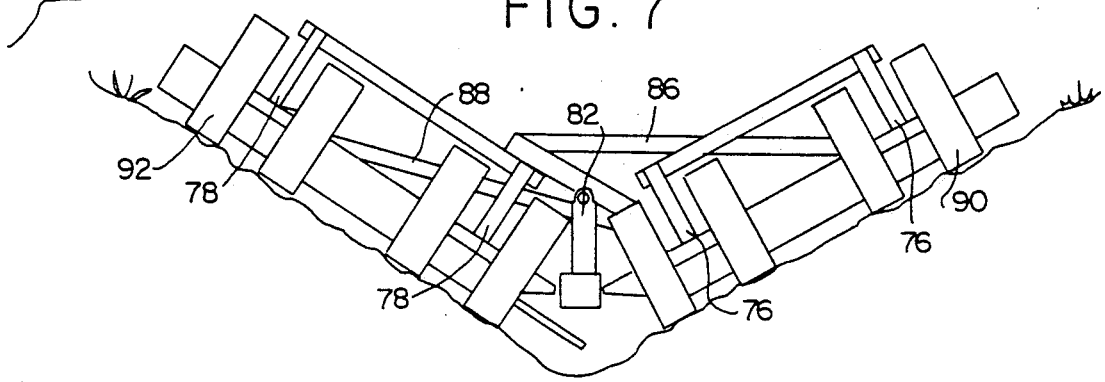

DOUBLE MOWER

BACKGROUND OF THE INVENTION

Prior to the development of our improved double mower it was extremely difficult to mow the grass at other than a flat horizontal plane. With our double mower, one of the mowers for example the left hand mower can operate on the horizontal strip at the top of a bed, while the right hand mower is operating on the angularly inclined side of the bed.

It will also be apparent that the right hand mower can be operating to mow the horizontal bed and that the left hand mower can be operating to mow an angularly inclined bed on the left hand side. It has heretofore been very difficult to mow the grass in the bottom of the V shaped ditches between the beds. With our improved double mower the blades automatically assume the appropriate angles to cut the grass on the inclined beds on both sides, and both sides of the ditch bottom can thus be mowed at a single cut. In view of the fact that gear drives are provided in the gear boxes the grass cutting blades overlap in their strokes but never clash as they never get out of phase to clash because of the gear drive from the power input to the mower.

Another large area of usage for our specialized double mower is for use on the roadway system where the blades can assume whatever angles are necessary relative to each other to adequately mow the different angular inclinations that are available.

When not in use in operating on groves planted on beds having a ditch or furrow between the beds our improved double mowers can readily mow areas that are horizontal because the blades of both mowers overlap each other, and are therefore fully operable when both mowers are horizontal relative to each other or at any other angles relative to each other.

FIELD OF THE INVENTION

Broadly stated the field of our double mower is to simultaneously and automatically mow the juncture areas of the angularly related areas of grass. These angularly related areas exist in the growing of orange groves and other tree crops which are preferably planted on spaced beds, and which thus have angularly related side edges.

The reverse of this condition exists in the highway road system where the area next to the highway slopes down angularly from the pavement to a horizontally extending relatively wide area to the edge of the right of way, and ditches are embodied on which grass must be mowed.

With our improved double mower we are able to mow the horizontal top edge of an orange grove bed, and at the same time to mow the angularly related sides of the edge of the orange grove bed with our hingedly mounted double mower.

It is necessary to periodically mow the grass in the bottom of the ditches between the beds, of orange grove plantings. That is normally an area that has more moisture than do areas higher up on the beds, and as a result the grass grows more rapidly there. With the single bladed mowers it has been difficult to mow these ditch bottoms, but it can readily be done with our improved double mower at a single pass.

SUMMARY OF THE INVENTION

Our double mowing machine is capable of taking care of virtually whatever mowing problems are involved in the processing of the land as it is formed into beds, regardless of how wide the beds are or of how deep the furrows or ditches are between the beds.

Orange groves are quite susceptible to excessive water, and as a result it is common practice to plant orange groves on beds with well pronounced drainage ditches between the beds and well laid out for drainage. Grass grows more rapidly in the bottoms of the ditches because those areas normally have greater moisture than does the land in the upper areas of the beds. With the equipment heretofore available it was difficult to keep the grass cut within reasonable limits in the bottoms of the ditches, now this troublesome problem has been solved.

BRIEF DESCRIPTION OF THE DRAWINGS

FIG. 4 is a rear elevational view of our double mower when operating on flat land.

FIG. 5 is a rear elevational view wherein the left unit is operating on horizontal land and the right hand unit is operating on an angularly inclined bed to the right.

FIG. 6 is a similar rear elevational view wherein the right hand unit is operating on horizontal land, and the left hand unit is operating on an angularly inclined bed to the left.

FIG. 7 is also a rear elevational view where both of the units are operating on angular relations relative to each other to mow the grass in the bottom of a ditch.

DESCRIPTION OF THE PREFERRED EMBODIMENT

Figure 1:
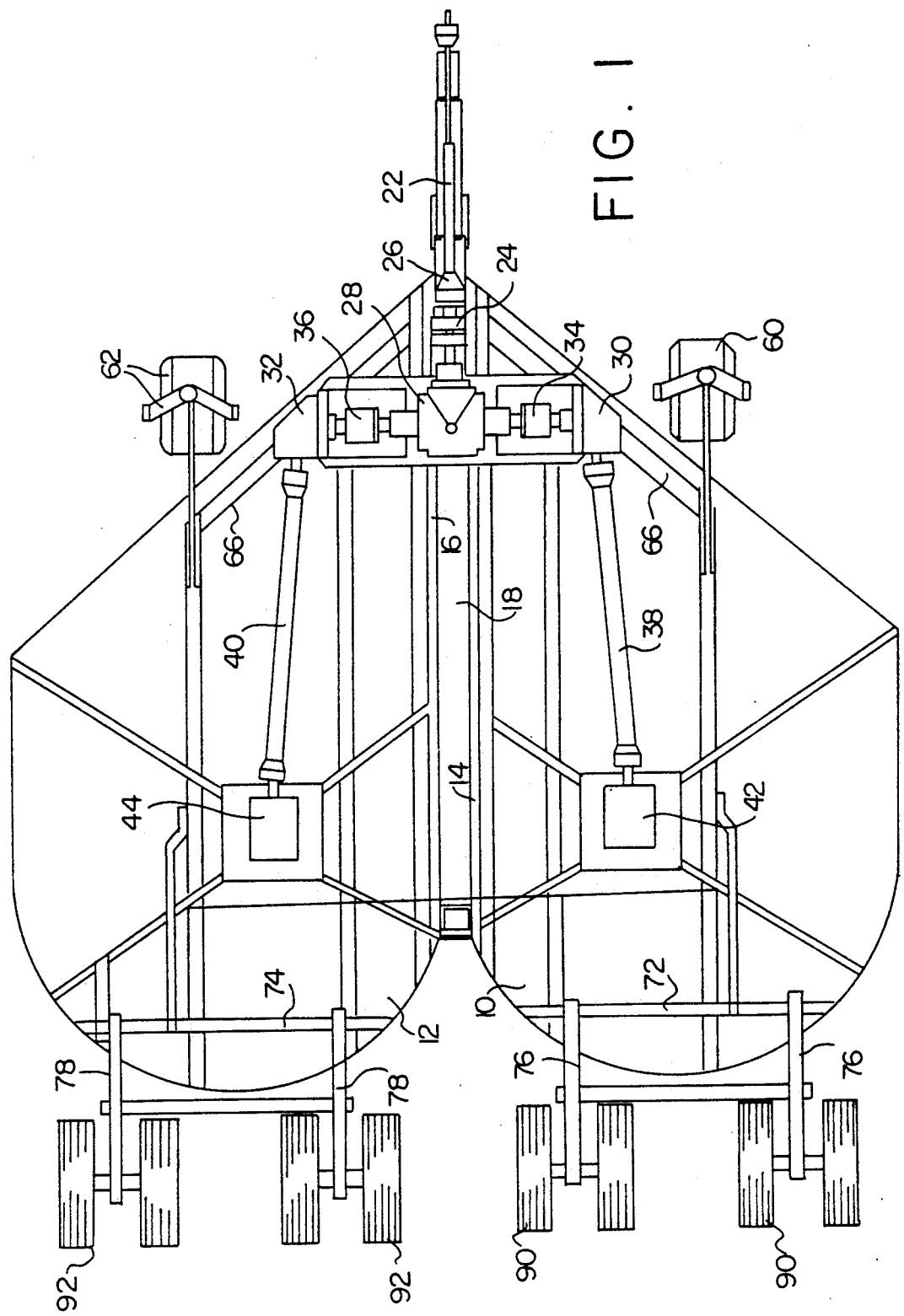
FIG. 1 is a plan view of our double mower.
Figure 2:
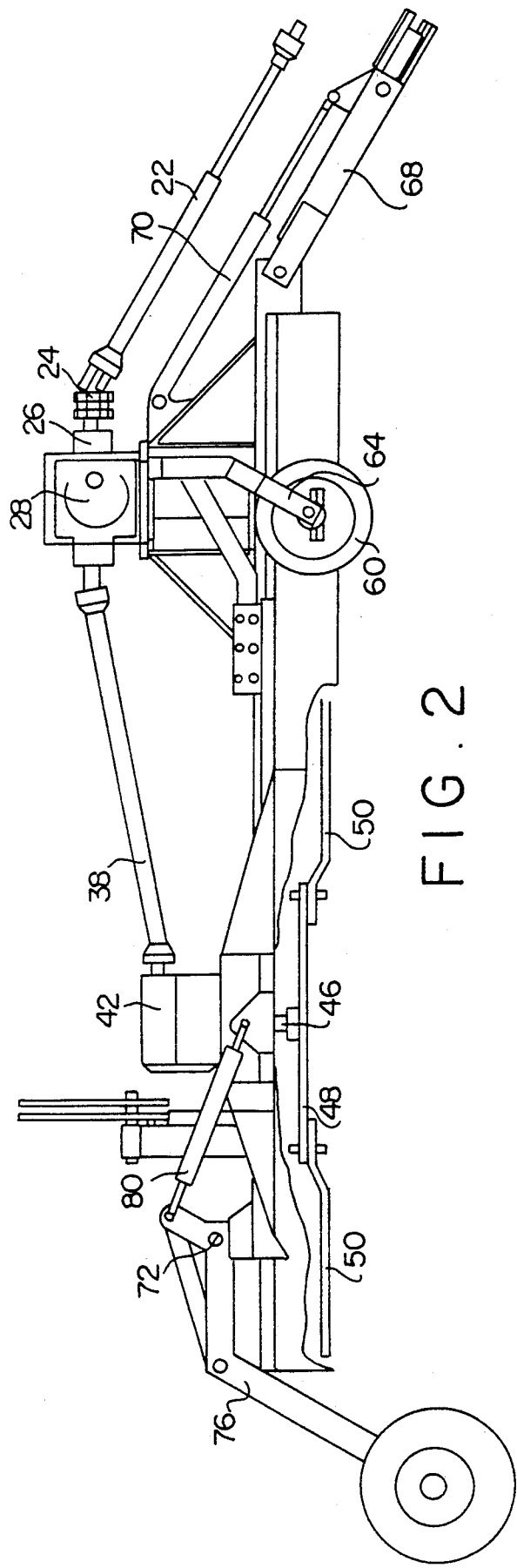
FIG. 2 is a side elevation of our double mower.
Figure 3:
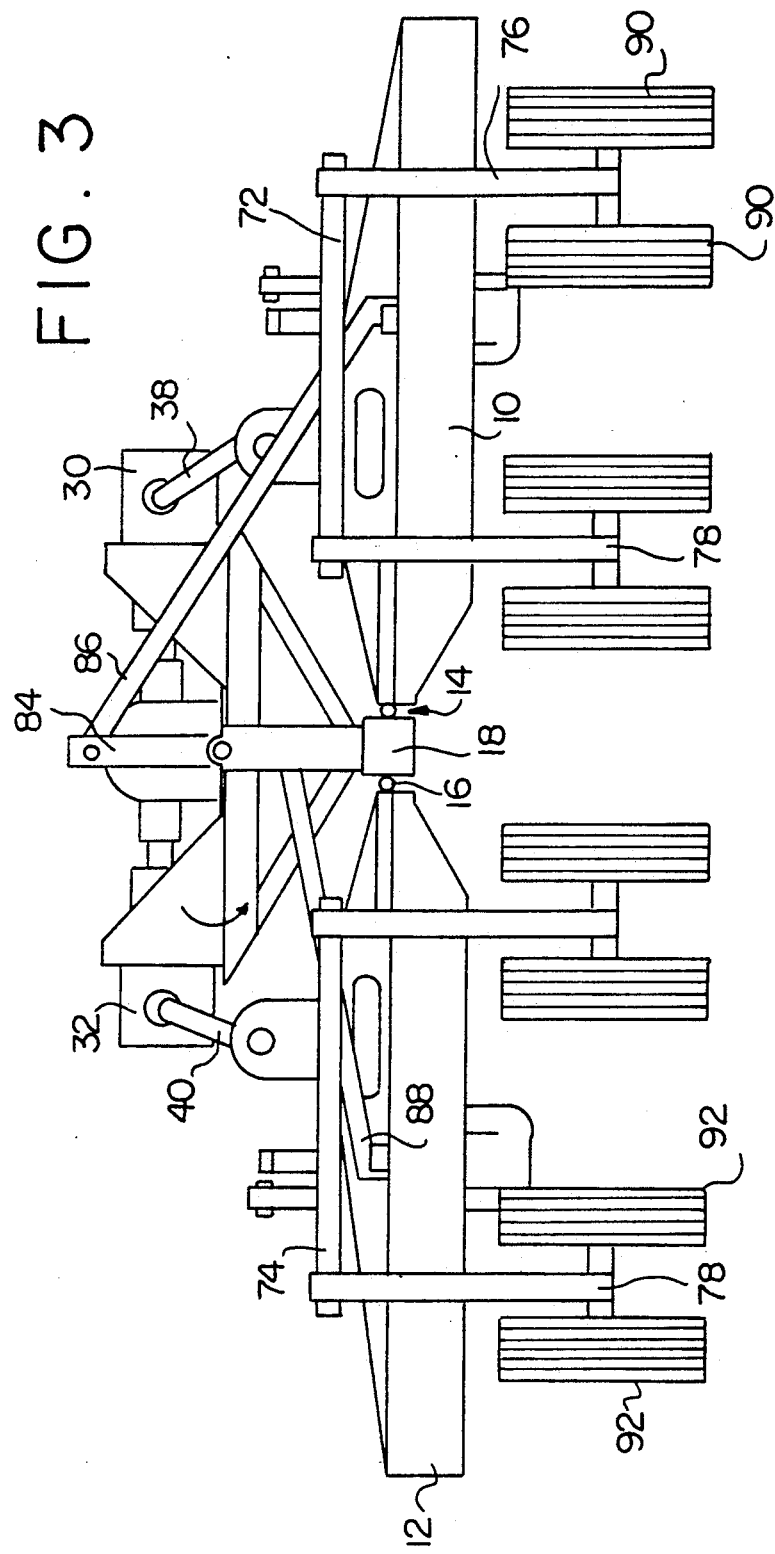
FIG. 3 is a rear elevational view of our double mower.

Referring now to FIGS. 1, 2, and 3, our invention is illustrated as embodied in a double mower 10 and 12 hingedly connected together by elongated hinges 14 and 16 on opposite sides of a carrier frame 18.

A source of power is provided to drive a driven shaft 22 connected through a clutch pack 24, and a universal joint 26 with a double gear box 28. The double gear box 28 drives two laterally spaced gear boxes 30 and 32 through shock units 34 and 36.

The laterally spaced gear boxes 30 and 32 are connected through drive shafts 38 and 40 with blade gear boxes 42 and 44 mounted on the double mowers 10 and 12. The blade gear boxes 42 and 44 mounted on the right and left double mowers 10 and 12 as seen in FIG. 2 operate through a system of shafts 46 and drive blade bars 48 to drive the spaced grass cutting blades 50 on each of the mowers 10 and 12.

Front wheel 60 and 62 mounted on inclined struts 64 carried by the front frame 66 to guide the front end of the mower and to induce the front end to follow the contour of the ground over which the double mower is moving.

The tongue 68 as controlled by the tongue cylinder and piston combination 70 is connected to the source of power and propels the double mower over the terrain over which the mower is to travel to cut the grass.

The rear ends of the units 10 and 12 are each provided with transversely extending wheel carrying shafts 72 and 74 to which angularly inclined wheel support arms 76 and 78 are secured. As more clearly shown in FIG. 2 the wheel carrying arms 76 and 78 are each provided with fluid pressure actuated cylinders 80 to control the angular positions of the arms 76 and 78 which carry the wheels 90 and 92, and with them the positions of the wheels relative to the double mower units 10 and 12 and the elevations of the cutter blades 50 relative to the grass being cut.

As shown more clearly in FIGS. 4 to 7 our double mower is very versatile, and can cut grass in a large variety of places that have heretofore been difficult if not virtually impossible to mow. It is completely versatile in that it can cut grass to whatever length is desired on flat land or on areas that are horizontal as shown in FIG. 4.

As shown in FIGS. 5 and 6, our double mower can mow grass with one of the mowers cutting the grass on the horizontal or flat areas, and with the other mower mowing the grass on the side of a bed. That is equivalent to a hillside on where one of the mowers would be mowing at an angle to the horizontal, as more specifically shown in FIG. 5 as being with the left hand mower 12 operating on the horizontal and with the mower 10 operating on the side of a bed.

FIG. 6 shows the other view where the right hand mower is operating to cut the grass on the horizontal, and the left hand mower operating to cut the grass on the left side of a bed.

Referring now to FIG. 7, one of the most difficult situations in caring for orange groves planted on beds is illustrated. That is the mowing of the grass at the bottom of the ditch or the bottom of the juncture of two beds. An equalizer arm bisects the angle between the disks. Attention is directed to the fact that in all instances where grass is being cut the equalizer arm 82 bisects the angle between the right and left hand mowers 10 and 12. This is achieved by means of the equalizer arm which, as shown in FIGS. 4 to 7 inclusive bisects the angle between the mowing sections 10 and 12. This is achieved by means of the control link 84 pivoted near its bottom to the top of the equalizer arm 82 as illustrated in FIG. 4 and wherein the link 88 is pivoted to the top of control link 84, and wherein the control link 88 is pivoted to the left hand end 12 of the mower section is pivoted to the equalizer arm 22 a short distance beneath the top of the equalizer arm.

We claim:

1. A double mower comprising a central longitudinally extending carrier frame member, a driving shaft, a double gear box secured to the longitudinally extending carrier frame and operably connected to the driving shaft, laterally spaced gear boxes on opposite sides of the double gear box, longitudinally spaced blade gear boxes, drive shafts between the laterally spaced gear boxes and the longitudinally spaced blade gear boxes, rotatable blades driven by the longitudinally spaced gear boxes, mower blade hoods overlying the laterally spaced mower blades, and hinge connecting means between the carrier frame and the mower blade hoods.

2. The invention defined in claim 1 wherein the hinge connecting means are elongated and have solid pin cores.

3. The invention defined in claim 1 wherein the blades of the longitudinally spaced gear boxes overlap each other in the area between the gear boxes because of the laterally spaced gear box drive the blades do not clash.

4. A grass cutting mower comprising a double gear box, two laterally spaced gear boxes on opposite sides of the double gear box, and elongated carrier for the double gear box and laterally spaced apart mower units on opposite sides of the elongated carrier, hinged connecting means between the elongated carrier and the spaced apart mower units, each mower unit having a blade gear box, drive shafts between the laterally spaced gear boxes and the blade gear boxes.

5. The invention defined in claim 4 wherein the hinged mower units are operable to mow grass at different angular elevations when one of the mower units is operating at a different angular relation relative to the other mower.

6. A double mower comprising a driving shaft, a double gear box operably connected with the driving shaft, laterally spaced gear boxes on opposite sides of the double gear box and operably connected with the double gear box, longitudinally spaced mower blade gear boxes, drive shafts interconnecting the longitudinally spaced mower blade gear boxes and the laterally spaced gear boxes, mower blades driven by the mower blade gear boxes, mower blade hoods overlying the laterally spaced mower blades, and hinged connecting means between the laterally spaced mower blade hoods.

7. The invention defined in claim 6 wherein a front wheel mounted on an angularly inclined pivoted strut carried by each of the mower blade hoods are provided to guide the front end of the mower over irregularities of land, and spaced rear wheels carried by each of the mower blade hoods are provided to control the depth of cut of the mower.

* * * * *